United States Patent Office 2,816,893
Patented Dec. 17, 1957

2,816,893

IMPROVEMENTS IN OR RELATING TO BIS-QUINOLINE DERIVATIVES

Robert Michel Jacob, Ablon-sur-Seine, Jacques Georges Robert, Paris, and Leonide Liakhoff, Vitry-sur-Seine, France, assignors to Societe des Usines Chimiques Rhone-Poulenc, Paris, France, a French body corporate No Drawing. Application March 9, 1953, Serial No. 341,338

Claims priority, application France March 12, 1952

9 Claims. (Cl. 260—286)

This invention relates to new organic compounds and has for its object to provide new quinoline derivatives of value in human and veterinary medicine, particularly as amoebicides.

The quinoline derivatives of the present invention are bases of the general formula:

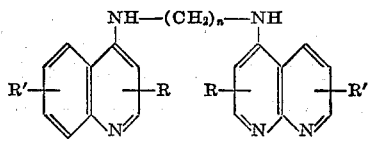

and the salts of such bases, where R represents a hydrogen atom or methyl radical in the 2- or 3-position of the quinoline nucleus, R' represents a halogen atom or methoxy group in the 6-, 7- or 8-position of the quinoline nucleus, and $n$ represents an integer greater than 2.

Particularly valuable new quinoline derivatives according to the invention are the α, ω-di-(7-chloroquinolyl-4-amino)-alkanes derived from straight chain alkanes having from 3 to 10 carbon atoms in the molecule, and their salts.

Compounds of the foregoing formula, i. e. substituted α,ω-di-(quinolyl-amino)-alkanes, and their salts may be obtained, in accordance with a feature of this invention, by condensing the α,ω-diamine of a straight chain alkane having more than 2 carbon atoms in the molecule with a substituted 4-halogenoquinoline having the general formula:

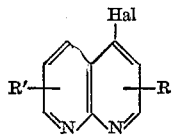

where R represents a hydrogen atom or methyl radical in the 2- or 3-position of the quinoline nucleus, R' represents a halogen atom or a methoxy group in the 6-, 7- or 8-position of the quinoline nucleus, and Hal represents a halogen atom, preferably a chlorine atom.

The condensation is preferably carried out by condensing two molecular proportions of the quinoline reactant, preferably a 4-chloro-quinoline derivative with one molecular proportion of the diamine reactant in the presence of a boiling solvent of high boiling point such as boiling phenol. In this way particularly valuable quinoline derivatives may be prepared from the α,ω-diamine of a straight chain alkane having from 3 to 10 carbon atoms in the molecule and 4:7-dichloroquinoline.

The hydrohalide salt of the quinoline derivative formed in the reaction mixture is preferably separated as the crude free base by basifying the reaction mixture, as by the addition of caustic soda, the crude base then being converted to the desired acid salt by one of the usual methods for converting organic bases into their salts. This salt may readily be purified by crystallisation. Where it is more convenient to do so, the free base may first be converted into an intermediate acid salt which may easily be purified by crystallisation, and the purified salt may then be transformed to the desired acid salt by metathesis, or by reprecipitation of the free base and conversion of the pure base thus precipitated to the desired acid salt.

It will be appreciated that the nature of the anion of the salts of the present invention is not critical from the therapeutic standpoint, but obviously any anions which are pharmacologically undesirable should be avoided.

As already indicated, the aforesaid compounds have valuable amoebicidal properties and may be used in human and veterinary medicine.

In the following example which serves to illustrate the invention, where melting points indicated are below 250° C. they were determined on the Kofler block. Otherwise they were determined on the Maquenne block.

*Example*

A mixture of 29.7 g. of 4:7-dichloroquinoline, 9.1 g. of hexamethylene diamine (96.5%) and 60 g. of phenol is boiled for 2 hours under reflux. The resulting mixture is poured, after cooling, into an excess of a caustic soda solution (10%). The product which precipitates is filtered and is then washed with water, following which it is triturated with 300 cc. of boiling methanol. The product is then filtered and washed with methanol, whereby 75 g. of wet crude base are obtained. This crude base is again suspended in 1.1 litre of boiling methanol. 37 cc. of concentrated hydrochloric acid (d.=1.19) are then added to the suspension to dissolve the base. The resulting solution is filtered hot, whereafter it is left to cool for the product to crystallise. The crystals are removed by filtration, washed with methanol and dried in vacuo. In this way 27 g. of 1:6-di-(7'-chloroquinolyl-4'-amino)-hexane dihydrochloride is obtained. A small portion of this salt is dissolved in hot aqueous methanol and rendered alkaline with ammonia to give the corresponding base, which melts at 280–281° C.

The following quinoline derivatives are prepared in similar manner:

1:3 - di - (7' - chloroquinolyl - 4' - amino) - propane, M. P.=315–317° C.

1:4 - di - (7' - chloroquinolyl - 4' - amino) - butane, M. P.=360° C.

1:5 - di - (7' - chloroquinolyl - 4' - amino) - pentane, M. P.=266–267° C., and its dihydrochloride, M. P.=248–250° C.

1:7 - di - (7' - chloroquinolyl - 4' - amino) - heptane, M. P.=222–223° C.

1:8 - di - (7' - chloroquinolyl - 4' - amino) - octane, M. P.=219–220° C.

1:10 - di - (7' - chloroquinolyl - 4' - amino) - decane, M. P.=200–202° C.

1:4-di-(7'-iodoquinolyl-4'-amino)-butane dihydrochloride, M. P.=331–332° C.

1:4 - di - (3' - methyl - 6' - chloroquinolyl - 4' - amino)- butane, M. P.=182° C.

1:4 - di - (2' - methyl - 8' - methoxyquinolyl - 4' - amino)- butane, M. P.=332–333° C.

1:4 - di - (2' - methyl - 6' - methoxyquinolyl - 4' - amino)- butane, M. P.=255° C.

We claim:

1. New quinoline derivatives of value in human and veterinary medicine, particularly as amoebicides, selected from the class consisting of bases of the general formula:

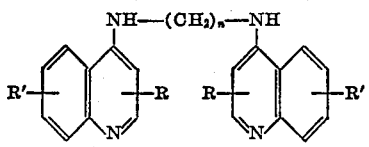

and the salts of such bases, where R represents a member of the class consisting of 2-position and 3-position hydrogen atoms and methyl radicals, R' represents a member of the class consisting of 6-position, 7-position and 8-position halogen atoms having an atomic weight at least that of chlorine and methoxy groups and $n$ is an integer of 3–10 inclusive.

2. A compound from the group consisting of bases having the formula

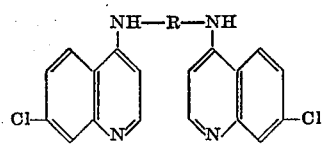

where R is an alkylene group having from 3 to 8 carbons and the salts thereof.

3. 1:6-di-(7'-chloroquinolyl-4'-amino)-hexane.
4. 1:4 - di - (3' - methyl - 6' - chloroquinolyl - 4'-amino)-butane.
5. 1:4 - di - (2' - methyl - 8' - methoxyquinolyl - 4'-amino) - butane.
6. 1:4 - di - (2' - methyl - 6' - methoxyquinolyl - 4'-amino)-butane.
7. Process for the production of a quinoline derivative which comprises heating together in the presence of a high boiling solvent an α,ω-di-primary amine of a straight chain alkane having 3–10 carbon atoms in the molecule and a substituted 4-halogenoquinoline having the general formula:

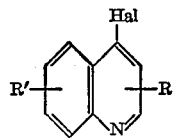

where R represents a member of the class consisting of a hydrogen atom and a methyl radical in one of the 2- and 3-positions of the quinoline nucleus, R' represents a member of the class consisting of a halogen atom of atomic weight at least that of chlorine and a methoxy group in one of the 6-, 7- and 8-positions of the quinoline nucleus and Hal represents a halogen atom of atomic weight at least that of chlorine.

8. Process according to claim 7 which comprises heating together in boiling phenol two molecular proportions of the substituted 4-halogenoquinoline reactant with one molecular proportion of the diamine reactant.

9. Process for the production of a quinoline derivative which comprises heating together in the presence of a high boiling solvent 4:7-dichloroquinoline and an α,ω-di-primary amine of a straight chain alkane containing 3–10 carbon atoms.

References Cited in the file of this patent

UNITED STATES PATENTS 2,050,971    Jensch _____ Aug. 11, 1936

FOREIGN PATENTS 857,332    France _____, Sept. 6, 1940